Nov. 11, 1930.  V. J. BURNELLI  1,780,993
AIRCRAFT
Filed Nov. 2, 1927    2 Sheets-Sheet 1
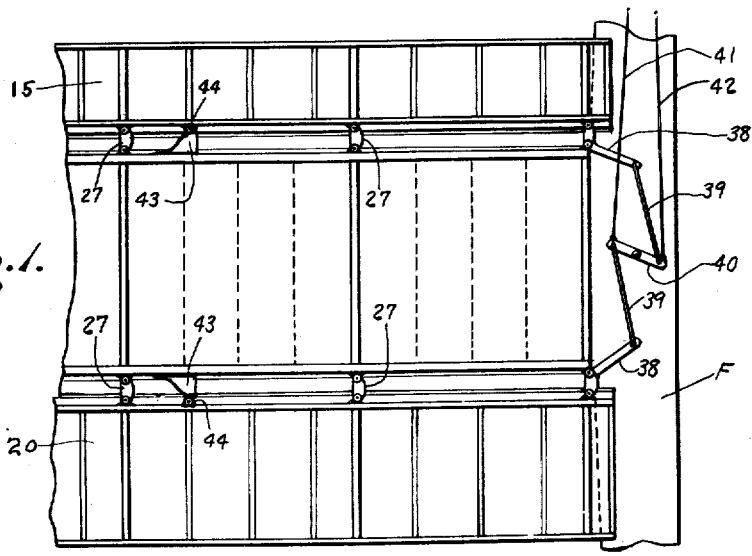
Fig. 1.
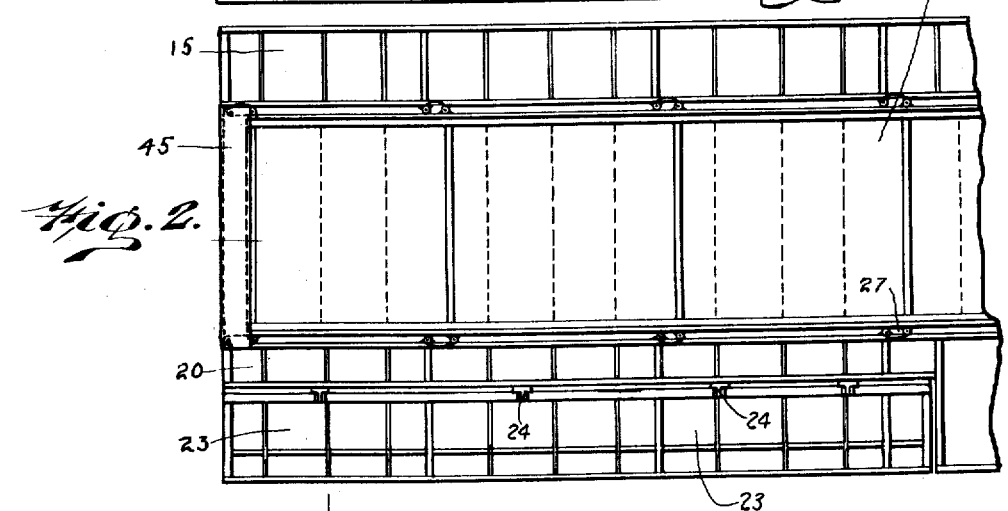
Fig. 2.
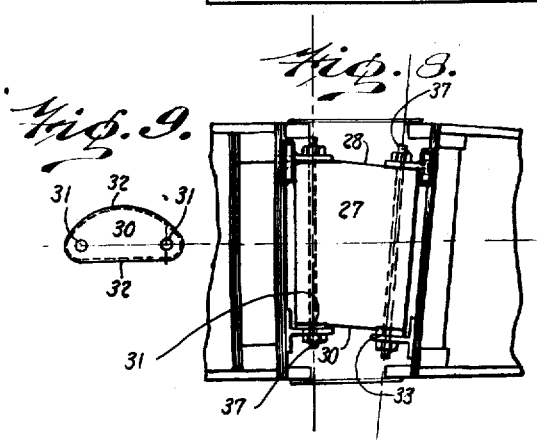
Fig. 9.  Fig. 8.
Fig. 2.ª
INVENTOR:
VINCENT J BURNELLI
BY Frank H. Borden
ATTORNEY.

Nov. 11, 1930.  V. J. BURNELLI  1,780,993
AIRCRAFT
Filed Nov. 2, 1927   2 Sheets-Sheet 2
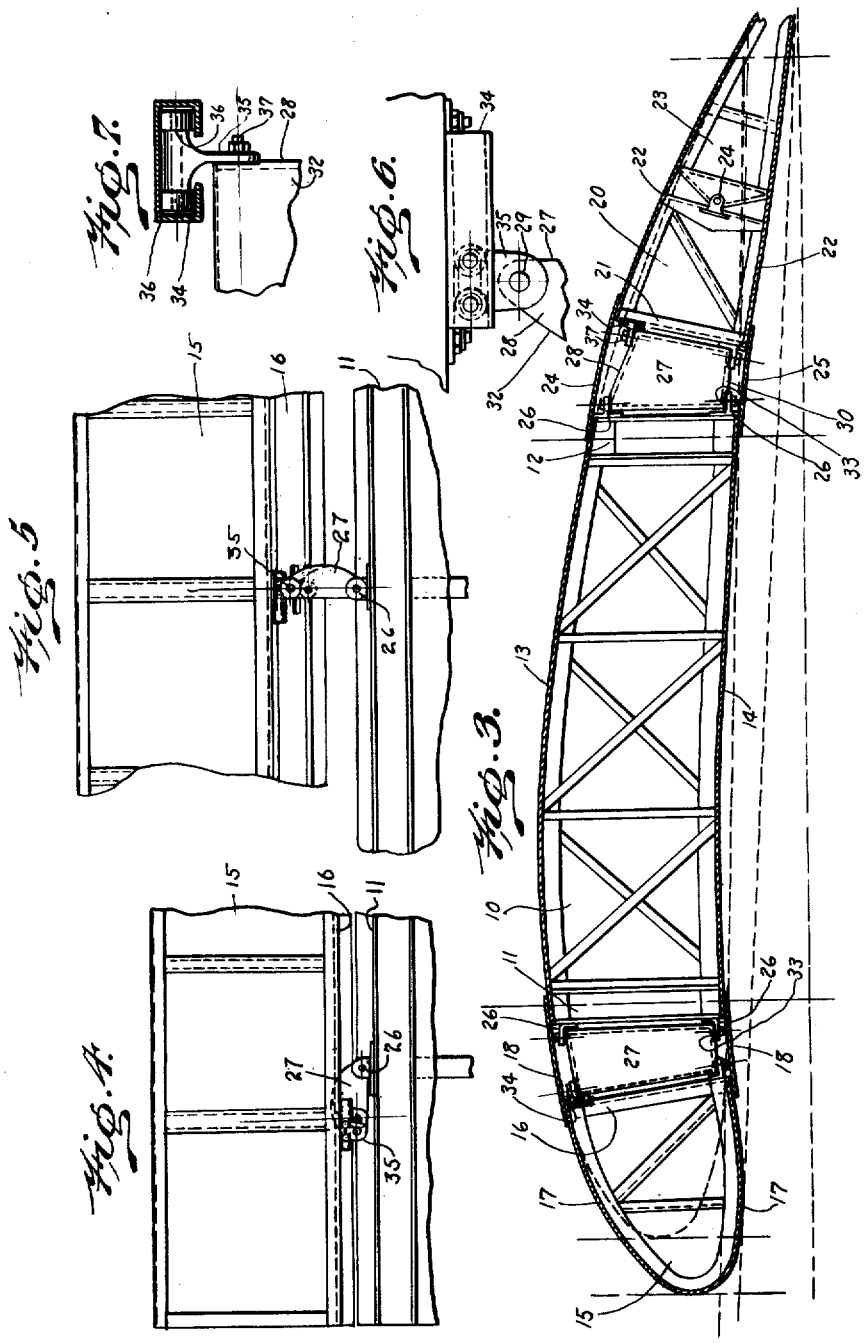
INVENTOR
VINCENT J BURNELLI
BY Frank H. Borden
ATTORNEY Patented Nov. 11, 1930

1,780,993

UNITED STATES PATENT OFFICE

VINCENT J. BURNELLI, OF NEW YORK, N. Y., ASSIGNOR, BY DIRECT AND MESNE ASSIGNMENTS, TO THE UPPERCU-BURNELLI CORPORATION, A CORPORATION OF DELAWARE

AIRCRAFT

Application filed November 2, 1927. Serial No. 230,645.

This invention relates to aircraft with particular reference to improvements in airfoils.

Among the objects of the invention are: to provide means for varying the area of an airfoil; to provide an airfoil of variable camber; to provide an airfoil with means for simultaneously varying the chord and camber; to provide an airplane with means for increasing the lift coefficient when desired for slow speed; to provide an airplane with means for increasing the chord of a supporting airfoil to reduce the unit load per square foot on the airfoil; to provide an airplane with means for increasing the lift coefficient and simultaneously to reduce the unit load per square foot of a supporting airfoil to increase the speed range of the airplane to a point appreciable above that obtainable from an airfoil of fixed or constant form; to provide in aircraft an airfoil susceptible to variations in chord and camber without apprecible shift of the center of pressure on the airfoil; to provide an airfoil with an extensible and oscillatable entering edge; to provide an airfoil susceptible to variations in chord and camber with means under the control of the pilot for effecting such changes in flight; and many other objects and advantages as will be more apparent as the description proceeds.

In carrying out the invention in a preferred but purely illustrative form, an airfoil is provided with a central supporting section carrying the main load to which independent entering edge and trailing edge sections are attached by links of novel construction and so arranged that movement of either edge section longitudinally of the central section varies the position of the edge section both as to closeness and as to angularity to the central supporting section.

In the accompanying drawings Fig. 1, represents the top plan of an airfoil and a fragmentary portion of the fuselage to which it is attached, the airfoil broken away and with the entering and trailing edge sections at their maximum adjusted positions away from the central supporting section and showing an operating device for effecting movements of the entering and trailing edge sections; Fig. 2, represents a fragmentary plan view of an airfoil according to this invention with the trailing and entering edge sections adjacent the central supporting section so that the chord of the air foil is a minimum; Fig. 2ⁿ represents a cross section through the open ended compartment at the end of the airfoil; Fig. 3, represents a section through the assembled airfoil with the entering and trailing edge sections shown in full lines in their maximum adjusted positions away from and at angles to the central supporting section and in dotted lines in their other extreme adjusted positions adjacent the central supporting section; Fig. 4, represents an enlarged plan of a portion of the central supporting section and a pivoted edge section with a reduced chord length; Fig. 5, is the same in the adjusted position with an increased chord length; Figs. 6 and 7 are details of the roller connection between the link and edge section; Fig. 8, represents a perspective view of the link and its points of pivotal attachment, and Fig. 9 represents a horizontal section through the link.

The airfoil of this invention comprises preferably a load sustaining central section 10 having the laterally extending spars 11 and 12 extending the length of the central section and which form the main support elements of the airfoil being anchored to the fuselage F or similar body elements in any desired and conventional manner. The specific construction of the central section is of little importance and has a skin covering of any desired material 13 on the upper surface and 14 on the lower surface.

The entering edge or edge section 15 has a spar 16 extending the length of the section and is provided with a skin or membrane covering 17 which may be extended and suitably reinforced as 18 to form an overlapping joint-covering flap at top and bottom.

The trailing edge section 20 has a spar member 21 its full length, a skin covering 22, and may include the aileron 23 hinged as at 24 in the structure of the trailing edge section. The skin coverings 13 and 14 on the central section may be continued rearwardly and suitably reinforced if desired to form the overlapping joint-covering flaps 24 and 25.

It is desired that the entering edge section and trailing edge section be susceptible to close association with the central section, at which point the chord and camber of the airfoil will be at a minimum (according to the predetermined design of the assembled unit) but that either or both of the edge sections may be moved away from the central section along the chord line and downwardly or toward the central section and upwardly, so as to vary the angles between the respective edge sections and the central sections whereby coincident with an increase in the area of the airfoil by lengthening the chord, the camber of the airfoil is increased by the lowering of the entering, or trailing, or both, edge sections.

To this end, links of novel construction are utilized mounted at desired points along the spars 11 and 12 of the central section by pairs of substantially vertically aligned pivots or ears 26; links 27 are pivotally connected for oscillation about a vertical pivot in the ears 26. Each link preferably comprises an upper plate 28, of such width between the pivot points 29 thereof, as to define the maximum extension desired between the respective edge section and the central section and a lower plate 30 of appreciably less distance between its pivot points 31 than the upper plate. The two plates are held in association as a unit, by any means desired, such as a roll of sheet metal 32, welded to the plates.

The edge sections are provided at the lower portion to the respective spars 16 and 21 with pivots or ears 33 in registry with the pivot points 18 on the spars 11 and 12 respectively. The cooperating pivot point on the edge section is movable in any desired manner, as by means of a cage 34 extending longitudinally of the spars 16 and 21 respectively in which the roller pivot 35 having bearing rollers 36 may have a slight movement. It will be understood that the pivot 35 and pivots 33 and 27 may be of any sort desired, so that links 27 may swing simultaneously on a pair of pivots 26 on one side and pivots 33 and 35 on the other, as by means of bolts 37 extending between the pivot points.

As shown in Fig. 1, the links adjacent the fuselage may comprise bell-crank levers 38 connected by links 39 to a pivoted arm 40 operable by cables 41 and 42 under the control of the pilot of the airplane. With the edge sections in the position shown in Fig. 1 in extended relation to the central section, retraction of the edge sections toward the central section is effected by manipulating lever 40, actuating bell-crank lever 38 and imparting longitudinal movement to the respective sections through their pivotal association with the central section. It will be clear that it is not necessary that the sections be operable simultaneously but may be arranged for independent movement.

To facilitate the separation of the edge sections from the central section, a wedge 43 may be mounted on the central section upon which roller 44 rides to force the ends of said section away from the central section upon the actuation of the bell-crank lever 38. It is pointed out that with the entering edge section and trailing edge section in close contact with the central section that the chord of the airfoil is relatively short and the camber relatively slight, depending, of course, upon the predetermined design of the airfoil, which may be designed for high speed and with a minimum lift coefficient. In order to effect a slow landing speed, the lift component of the airfoil is appreciably increased by lowering the entering and trailing edge sections with relation to their initial disposition, thus effecting an appreciable change in the camber of the airfoil, but as the altered camber is effected by both the entering edge and the trailing edge, there is no resultant shift of the center of pressure of the airfoil. As the entering edge is extended from the central supporting section and preferably simultaneously the trailing edge is also extended therefrom, the chord of the airfoil is appreciably extended, so that the effective area of the airfoil is increased and so that the unit load per square foot of area is appreciably reduced, contributing further to a lowering of the landing speed.

To provide a terminus for the central section 10, an open ended compartment or box 45 is provided extending transversely of the end of said section, of such width that with the movable sections 15 and 20 in the retracted position shown in Fig. 2, the ends of the movable sections and the outer edge of the box are in registry so that the drag of the wing tip is minimized. As the movable wing sections are moved toward the position indicated in Fig. 1, the ends thereof are swung outwardly and away from the open ends of the box, exposing the open end behind the entering edge, to the air stream, which passes freely through the box and out at the other end, with but little drag effect thereon. As the drag at slow speeds is not appreciable in any case, this arrangement finds its main effectiveness in the high speed position in which the chord and camber are at their minimum, with an efficient wing tip as disclosed.

It is to be noted that in varying the effective area and camber of the airfoil under the manual control of the operator in flight, there are no unbalanced pressures on the sections to be moved, which cannot easily be overcome by manual power.

While only a single form is shown in which this invention may be embodied, it is to be understood that the invention is not limited to any specific construction, but might be applied to various forms without departing from the spirit of the invention or the scope of the appended claims.

I claim as my invention:

1. In an airfoil, a rigid section, an edge section, hinge means for joining the sections, means preventing a flow of air between the sections, the axes of the hinge means being in a plane substantially perpendicular to the edge of the sections in one adjusted position of the edge section but the axes of said hinge means being in two divergent planes in another adjusted position of the edge section.

2. In an airplane, a wing including a central section, an entering edge section and a trailing edge section attached to the central section but susceptible to longitudinal movement relative to the central section, means preventing a flow of air between the sections, means interposed between the respective edge sections and the central section responsive to such longitudinal movement to simultaneously vary the chord and camber of said wing.

3. An airfoil comprised of sections, a plurality of links interposed between the sections, each link including pivot points at top and bottom but spaced further apart at the top than at the bottom, means preventing a flow of air between the sections, means for moving one section, the links so arranged that movement of the section causes the upper part of said section to move further from an unmoved section than the lower part thereof whereby the tip of the section drops to increase the camber of the airfoil simultaneously with an increase in the chord thereof.

4. In an airplane, an airfoil including entering and trailing edge sections, both sections simultaneously movable in three planes to simultaneously vary the camber and chord of the airfoil without appreciable shift of the center of pressure thereof.

5. In combination in an airplane, a central section and an edge section, a link connecting the sections comprising upper and lower plates having pivot engaging means and of different sizes, means sustaining the two plates in spaced relation and forming with the plates a rigid unit capable of resisting torsional strains when interposed between the rigid and edge sections.

6. In an airplane, an airfoil including entering and trailing edge sections, either section movable in three planes to simultaneously vary the camber and chord of the airfoil.

7. An airfoil comprising a central rigid section including fore and aft longitudinal substantially vertically extending spars; links pivotally mounted relatively to said spars with their axes in a plane substantially parallel with the vertical extent of said spars; an entering edge section and a trailing edge section pivotally mounted respectively on said links, the axes of the pivots on the edge sections being in one adjusted position in a plane divergent from the vertical extent of said spars.

8. An airfoil including a stationary and a movable section; an open ended compartment mounted on the stationary section parallel with the chord of the airfoil substantially; the movable section arranged to cover and uncover an open end of said compartment within the range of its movements.

9. An airfoil comprising a stationary central section, an open ended box at the end of the section; an entering edge section and a trailing edge section arranged for longitudinal movement relative the central section, in one position covering the open ends of the box, and in another adjusted position uncovering the ends of the box so that an air stream may flow through the box.

10. In an airfoil in combination, a stationary section, and movable sections adjustable in three directions from the stationary section, in one adjusted position extending beyond the end of the stationary section; and an open-ended box carried by the stationary section and in registry with the edges of the movable sections to form a substantially uninterrupted surface; and arranged to permit the flowing of an air stream between the edge of the means and the end of the stationary section when the movable sections are in another adjusted position.

Signed at Philadelphia, county of Philadelphia, State of Pennsylvania, this 28th day of October, 1927.

VINCENT J. BURNELLI.